United States Patent [19]
Nichols-Roy

[11] Patent Number: 5,623,961
[45] Date of Patent: Apr. 29, 1997

[54] TOILET FLUSH TANK FILL VALVE ASSEMBLY

[75] Inventor: David Nichols-Roy, Escondido, Calif.

[73] Assignee: Hunter Plumbing Products, San Marcos, Calif.

[21] Appl. No.: 599,777

[22] Filed: Feb. 12, 1996

[51] Int. Cl.$^6$ .............................. F16K 31/26; F16K 51/00
[52] U.S. Cl. .................... 137/377; 137/444; 137/592
[58] Field of Search ........................... 137/312, 377, 137/382, 414, 428, 429, 436, 437, 441, 442, 443, 444, 592

[56] References Cited

U.S. PATENT DOCUMENTS

| | | | |
|---|---|---|---|
| 2,195,797 | 4/1940 | Groeniger | 137/592 |
| 2,706,998 | 4/1955 | Bletcher et al. | 137/436 |
| 2,791,235 | 5/1957 | Smith | 137/444 |
| 3,332,433 | 7/1967 | Edmondson | 137/444 |
| 3,930,516 | 1/1976 | Flinner et al. | 137/436 |
| 4,340,082 | 7/1982 | Straus | 137/444 |
| 4,420,845 | 12/1983 | Antunez | 137/444 |
| 4,730,639 | 3/1988 | Antunez | 137/444 |
| 5,255,703 | 10/1993 | Johnson | 137/426 |
| 5,280,803 | 1/1994 | Swift et al. | 137/444 |

Primary Examiner—George L. Walton
Attorney, Agent, or Firm—Baker, Maxham, Jester & Meador

[57] ABSTRACT

A flush tank fill valve assembly, comprises an elongated tubular riser having a threaded upper end and a threaded lower end, the riser being adapted to be mounted by the lower end in an opening in a bottom of a flush tank, and for connecting to a source of water, a flush valve including a housing having a nipple defining a threaded inlet opening adapted to mount on the upper end of the riser, and an elongated tubular sleeve adapted to mount over the riser and having first members for limiting rotation between the sleeve and the riser, and second members for limiting rotation of the sleeve relative to the valve.

18 Claims, 2 Drawing Sheets

TOILET FLUSH TANK FILL VALVE ASSEMBLY

BACKGROUND OF THE INVENTION

The present invention relates to plumbing apparatus, and pertains more particularly, to an improved fill valve assembly for flush systems used in gravity flush toilets.

Conventional toilets typically employ a generally rectangular porcelain tank mounted immediately above a porcelain bowl from which from a quantity of water is rapidly drained in order to flush waste from the bowl into the sewer system. One very common design uses a flapper valve made of an elastomeric material that normally covers the drain outlet of the tank. When the flush handle on the outside of the tank is manually depressed the flapper valve is lifted and the head of water in the tank drains through the drain outlet into the bowl, thereby flushing the contents of the bowl into the sewer system. The flapper valve is designed with an inverted air chamber so that it initially floats as it is lifted away from the drain outlet in the bottom of the tank. This allows sufficient flushing water to flow into the bowl even if the user immediately releases the flush halide. When the water level in the tank drops, it is automatically refilled through a fill valve connected to a high pressure water supply line.

The typical fill valve for the tank comprises a ballcock valve mounted in the tank on top of a riser which extends through an opening in the bottom of the tank and is connected to a pressurized water line in the house. When the tank drains, a float connected to the ballcock valve descends. This activates the ballcock valve and it begins to refill the tank with water at a rate much slower than the rate at which water flows through the drain outlet. When the tank is nearly empty, the flapper valve closes. The tank continues to refill as the float connected to the ballcock rises. At the same time water from the ballcock valve enters an overflow tube and refills the bowl to the normal standing water level to provide a trap seal. Once the float reaches a predetermined height indicating that the tank is full, the ballcock valve completely turns OFF.

The foregoing conventional arrangement is still widely used today and has been adapted to toilet designs of the lowboy design wherein the tank is shallow and is normally molded into the toilet bowl. The valve is mounted on the top of the riser in a number of ways, but must be permanent for the life of the product, once installed. Many of the installations do not provide a permanent seal. The tank is shallow and the plumbing code requires a sheath around the riser to prevent backflow in case of pressure loss in the water supply line. The sheath is a tube that extends from the bottom of the tank above the water level in the tank and is sealed at the tank inlet providing an air chamber around the riser that is vented around the inlet of the riser to below the tank.

One major problem with these type valve assemblies is that the valve is usually threadably mounted on top of the riser with all axially compressible seal and can become slightly unthreaded sufficiently to allow leakage. This can allow backflow of water from the tank into the supply line, and/or leakage of inlet water onto the floor of the bathroom and potentially causing severe damage.

Accordingly, it is desirable that some means be available to overcome the above problem of the prior art.

SUMMARY OF THE INVENTION

It is the primary object of the present invention to provide an improved fill valve apparatus for overcoming the above problems of the prior art.

In accordance with a primary aspect of the present invention, a flush tank fill valve assembly, comprises an elongated tubular riser having a threaded upper end and a threaded lower end, said riser adapted to be mounted by said lower end in an opening in a bottom of a flush tank, and for connecting to a source of water, a fill valve including a housing having a nipple defining a threaded inlet opening adapted to mount on said upper end of said riser, and an elongated tubular sleeve adapted to mount over said riser and having first means for limiting rotation between said sleeve and said riser, and second means for limiting rotation of said sleeve relative to said valve, providing the double wall protection of potable water supply, as deemed necessary by code requirements for one-piece toilet valve assemblies.

BRIEF DESCRIPTION OF THE PREFERRED EMBODIMENTS

The above and other objects and advantages of the present invention will be apparent from the following description when read in conjunction with the accompanying drawings wherein.

DETAILED DESCRIPTION OF THE PREFERRED EMBODIMENTS

Figure 1:
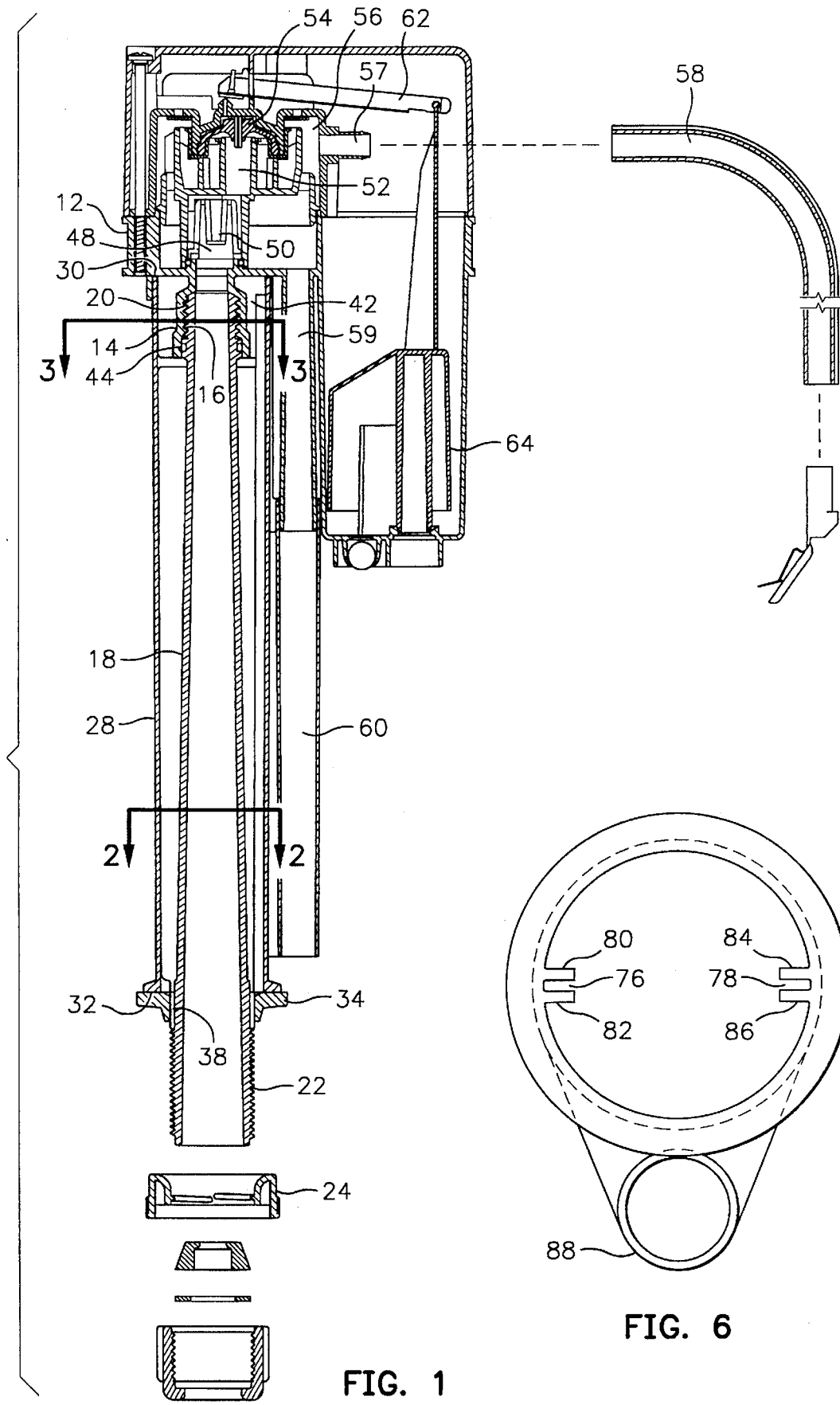
FIG. 1 is a side elevation section view of a refill apparatus in accordance with a preferred embodiment of the invention.

Referring to the drawings, particularly FIG. 1, there is illustrated a refill valve apparatus in accordance with the preferred embodiment of the invention designated generally by the numeral 10. The overall apparatus 10 comprises a refill valve constructed substantially in accordance with that disclosed and covered in U.S. Pat. No. 5,255,703, granted Oct. 26, 1993 to Dwight N. Johnson and incorporated herein by reference as though fully set forth. The valve is embodied in a housing or body 12 having a downwardly depending nipple 14 with internal threads defining all inlet to the housing body. The threads 16 are adapted to mount the valve on top of an elongated tubular riser 18 having threads 20 on the upper end for threadably engaging the threads 16 of the valve housing 12. The nipple on the housing can have external threads and the upper end of the riser can have internal threads. The elongated riser 18 includes threads 22 on the lower end for receiving a nut 24 for mounting the riser in an opening in a bottom of a flush tank. The riser is provided with radially extending ribs 26, extending substantially the full length of the riser and radially outward at substantially 90 degree positions around the peripheral diameter of the riser 18. These ribs may be slightly offset from the radial as will be subsequently explained. The riser may be constructed of any suitable material such as plastic or a copper alloy such as brass. If it is constructed of brass, it may be cast and the threads formed by machining.

An elongated tubular sheath 28 is slipped over and surrounds the riser 18 and includes an upper peripheral edge or end 30 that engages a lower surface of the valve body 12 and a lower flanged peripheral end 32 that engages a seal or gasket 34 at the lower end to seal the tube within the flush tank. The sheath serves the purpose of separating the water in the flush tank from the riser and from the outside of the tank and provides an air space or vent between the sheath and the riser 18, to a point above the water line. The air space communicates by way of grooves 38 at the bottom of the riser to the exterior of the flush tank.

The sheath 28 is provided with inwardly extending radial ribs 40 which overlap and engage radial ribs 26 on the riser 18. In addition, the inwardly extending ribs 40 overlap radially extending ribs 42 on nipple 14 of the housing or valve body 12. These overlapping ribs function to interlock and/or couple the riser, the sheath 28, and the nipple 14, such that the valve at the top of riser 14 cannot unscrew from the top of riser 18. The ribs, depending on the number, limit the rotation between the valve body and the riser to a maximum a quarter turn with respect to the illustrated embodiment. This prevents sufficient unthreading of the valve body to enable leakage of water from the tank into the riser 18 and ultimately into the supply water, in case of pressure drop in that system. An alternate modification to prevent relative rotation between the riser and sleeve could comprise one or more ribs on one surface of one and a corresponding groove in an opposed surface of the other. However, this may require more precise location of the start and end of the threads to provide for proper alignment with ribs or groove on the nipple.

The riser 18 includes an O-ring seal groove 44 that is positioned at the upper end of the riser to extend into the interior bore of the nipple 14. The groove 44 is adapted for receipt of an O-ring seal 46, the groove being positioned such that substantial unthreading of the riser must occur to release of the seal 46 from sealing engagement with the interior of the bore.

When installing a valve apparatus or assembly in a flush tank, a valve body 12 is attached or threaded to the top of the riser 18 and tightened sufficient to prevent leakage from the connection around the O-ring 46. A sleeve 28 is then slipped over the riser and over the end of the nipple 14 to overlap the respective ribs and interlock the assembly to prevent unthreading of the valve from the riser. The riser is then installed in the tank with the lower end of the sleeve 28 having a gasket or seal 34 installed with the threaded portion 22 of the riser extended through an opening in the bottom of the flush tank where nut 24 is then installed to mount the valve assembly in the tank. A pressurized water supply line is then connected to the end of the riser to supply water to the riser where it rises up to and is controlled by the valve. The valve is essentially as described in the prior patent as pointed out above with minor modifications that will be subsequently described. The valve assembly includes a passage 48 through which water enters the valve body and through a filter 50 and into valve passage 52 where a float operated pilot valve which controls a secondary main valve 54 is operated to permit the water to pass into a passage of outlet passage 54 where it is directed by way of a passage 56 to an outlet 57 and through a tube 58 to the overflow pipe (not shown). Another outlet includes a downward directed tube a tube 59 into the tank. The filter 50 protects the valve 54 from sand and debris and is accessible from the top of the housing without the need for removing the supply line, or the valve from the tank. The valve 54 is operated by a lever 62 and a float 64.

In this embodiment the ribs 42 on the nipple 14 prevent rotation of the sleeve 28 by engagement with the mutual ribs thereof and the sleeve 28, in turn, prevents rotation of the riser 18 thereby preventing possible unthreading of the valve from the top of the riser.

Figure 4:
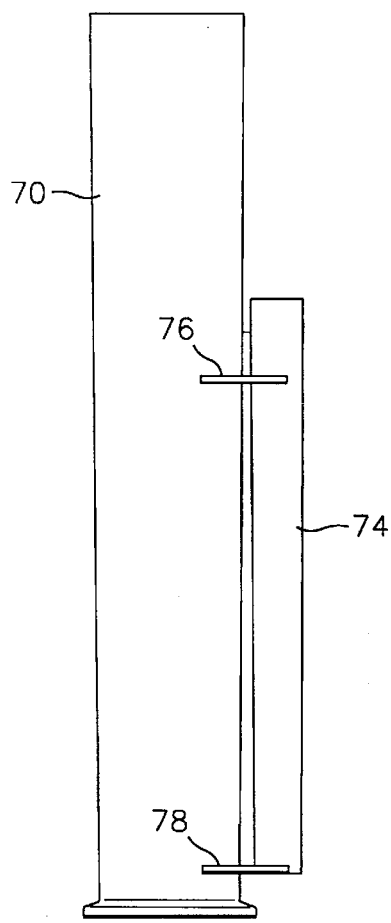
FIG. 4 is a side elevation view of an alternate embodiment of the invention.
Figure 5:
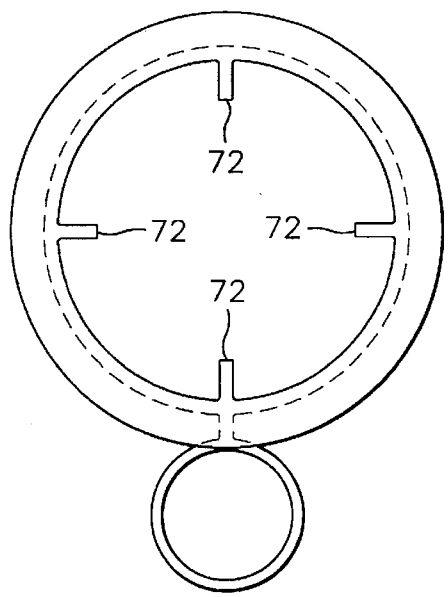
FIG. 5 is an end view from the bottom of FIG. 4.

Referring now to FIGS. 4 and 5, an alternate embodiment is illustrated wherein a sleeve 70 includes a barrel as in the previous embodiments having interior ribs 72, as in the prior embodiment for engagement with ribs on the riser. In this embodiment the sleeve 70 includes a fill tube 74 as an intergal part thereof extending parallel thereto and attached to the slide thereof by brackets 76 and 78. The fill tube 74 may be molded integral with the sleeve 70 or may be assembled from separate components and attached thereto, thereby eliminating an extra part. The fill tube 74 is secured to the tube 70 so that the tube may then be assembled onto a valve assembly not having ribs on the nipple so that the tube 74 registers with the tank fill tube or outlet tube 59 of the valve and thereby prevent rotation of the valve relative to the riser 18. This eliminates the necessity for modifying the valve body to have ribs on the nipple. Thus, the tube 74 couples or connects to an outlet tube of the valve housing and prevents rotation of the sleeve or sheath 70 relative to the valve body. The sleeve 70 in turn 70 prevents rotation of the riser 18 relative to the valve body 14.

Figure 6:
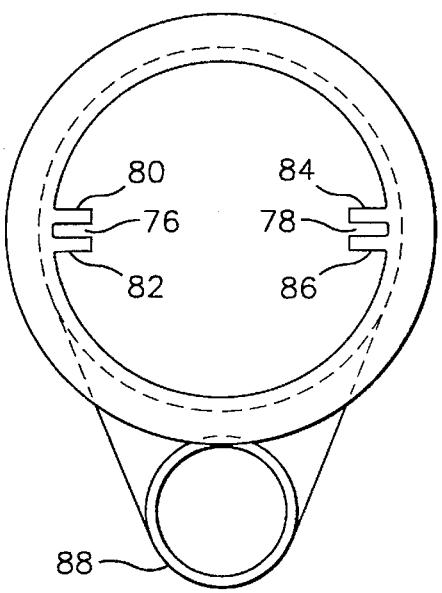
FIG. 6 is an end view like that of FIG. 4 of another embodiment.
Figure 2:
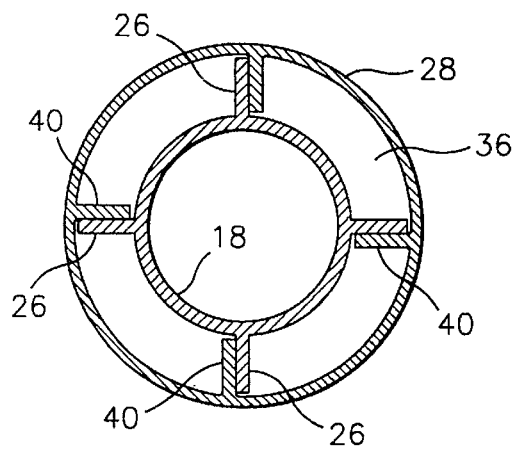
FIG. 2 is a section view taken generally on line 2—2 of FIG. 1.
Figure 3:
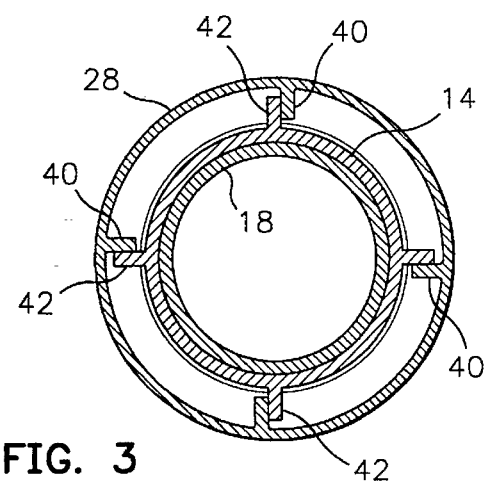
FIG. 3 is a section view taken generally on line 3—3 of FIG. 1.

Referring to FIG. 6 another embodiment of the sleeve or sheath is illustrated. This sleeve 75 has the same exterior as the prior one but with a pair of grooves 76 and 78 formed on the interior thereof. These grooves are formed by pairs of ribs 80, 82 and 84, 86. A pair of ribs on the riser extend into these grooves so that rotation between the riser and sleeve is prevented. A tube 88 connects to tube 59 on the valve body to prevent rotation of the sleeve 75 relative to the valve body. It will be apparant that a single groove will be sufficient to prevent relative rotation and may be on either member.

While I have illustrated and described my invention by means of specific embodiments, it is to be understood that numerous changes and modifications may be made therein without departing from the spirit or scope of the invention, as defined in the appended claims.

I claim:

1. A flush tank fill valve assembly, comprising:
   an elongated tubular riser having a threaded upper end and a threaded lower end, said riser adapted to be mounted by said lower end in an opening in a bottom of a flush tank, and for connecting to a source of water;
   a flush valve including a housing having a nipple defining a threaded inlet opening adapted to mount on said upper end of said riser; and
   an elongated tubular sleeve adapted to detachably mount over said riser and having first means for extending between said sleeve and said riser for engagement and limiting rotation between said sleeve and said riser, and second means for extending between said sleeve and said riser for engagement and limiting rotation of said sleeve relative to said valve for preventing unthreading of said flush valve from said upper end of said riser.

2. An apparatus according to claim 1 wherein said means for limiting relative rotation between said sleeve and said riser comprises an inwardly extending rib in said sleeve, and an outwardly extending rib on said riser, said ribs overlap so that said rib on said riser engage said rib in said sleeve.

3. An apparatus according to claim 2 wherein said means for limiting relative rotation between said sleeve and said valve comprises an outwardly extending rib on said nipple adapted for engaging said inwardly extending rib in said sleeve.

4. An apparatus according to claim 2 wherein said means for limiting relative rotation between said sleeve and said valve comprises an elongated tube on an outer surface of said sleeve adapted to mate with a tube on said valve.

5. An apparatus according to claim 4 wherein said ribs on said riser are at least four in number, and said ribs on said sleeve are at least four in number so that relative rotation between said riser and said sleeve is no more than one quarter turn.

6. An apparatus according to claim 2 wherein said ribs on said riser are four in number, and said ribs on said sleeve are four in number so that relative rotation between said riser and said sleeve is one quarter turn.

7. An apparatus according to claim 1 wherein said means for limiting relative rotation between said sleeve and said riser comprises a radially extending rib on one of said sleeve and said riser, and a groove on the other of said sleeve and said riser.

8. An apparatus according to claim 4 wherein said means for limiting relative rotation between said sleeve and said riser comprises a radially extending rib on one of said sleeve and said riser, and pair of closely spaced ribs defining a groove on the other of said sleeve and said riser.

9. An apparatus according to claim 1 wherein:

said means for limiting relative rotation between said sleeve and said riser comprises inwardly extending ribs in said sleeve, and outwardly extending ribs on said riser, said ribs overlap so that said ribs on said riser engage said ribs in said sheath; and said means for limiting relative rotation between said sleeve and said valve comprises outwardly extending ribs on said nipple adapted for engaging said inwardly extending ribs in said sleeve adapted to overlap said ribs on said nipple so that said ribs on said riser and nipple engage said ribs in said sheath.

10. An apparatus according to claim 1 wherein said flush tank fill valve assembly comprises a housing, wherein:

said means for limiting relative rotation between said sleeve and said riser comprises inwardly extending ribs in said sleeve, and outwardly extending ribs on said riser, said ribs overlap so that said ribs on said riser engage said ribs in said sheath; said means for limiting relative rotation between said sleeve and said valve comprises an elongated tube on an outer surface of said sleeve adapted to mate with a tube on said valve.

11. A flush tank fill valve apparatus, comprising:

an elongated tubular riser having at least one longitudinally extending rib on an outer surface thereof, a threaded upper end for mounting a valve housing, and a threaded lower end for mounting said riser in an opening in a bottom of a flush tank, and for connecting a source of water;

a flush valve having a nipple defining an inlet opening, said nipple having threads for mounting said valve housing on said upper end of said riser;

an elongated tubular sheath having inner longitudinally extending ribs adapted to detachably mount on said riser and overlap and engage said ribs on said riser and limit rotation of said riser relative to said sheath; and means extending between said sheath and said valve for limiting relative rotation between said valve and said riser and to thereby limit rotation of said riser relative to said valve for preventing unthreading of said flush valve from said upper end of said riser.

12. An apparatus according to claim 11 wherein said means for limiting relative rotation between said sleeve and said valve comprises outwardly extending ribs on said nipple adapted for engaging said inwardly extending ribs in said sleeve means for limiting relative rotation between said valve and said riser comprises inwardly extending ribs adapted to mount on said riser and overlap said nipple so that said ribs on said riser and nipple engage said ribs in said sheath.

13. An apparatus according to claim 12 wherein said ribs on said riser are four in number, and said ribs on said sleeve are four in number so that relative rotation between said riser and said sleeve is one quarter turn.

14. An apparatus according to claim 13 wherein said means for limiting relative rotation between said sleeve and said valve comprises outwardly extending ribs on said nipple adapted for engaging said inwardly extending ribs in said sleeve.

15. An apparatus according to claim 13 wherein said means for limiting relative rotation between said sleeve and said valve comprises an elongated tube on an outer surface of said sleeve adapted to mate with a tube on said valve.

16. An apparatus according to claim 11 wherein said ribs on said sleeve are a pair of closely spaced ribs defining a groove on said sleeve for receiving a rib on said riser.

17. A fill valve assembly for mounting in a flush tank, comprising:

an elongated tubular riser having a plurality of longitudinally extending rib on an outer surface thereof, a threaded upper end for mounting a valve housing, and a threaded lower end for mounting said riser in an opening in a bottom of a flush tank, and for connecting a source of water;

a flush valve having a nipple defining an inlet opening, said nipple having threads for mounting said valve housing on said upper end of said riser, and said nipple having longitudinally extending ribs on an outer surface thereof; and an elongated tubular sheath having inwardly extending ribs adapted to detachably mount on said riser and overlap said nipple so that said ribs on said riser and nipple engage said ribs in said sheath and limit rotation of said riser relative to said valve for preventing unthreading of said flush valve from said upper end of said riser.

18. An apparatus according to claim 17 wherein said ribs on said riser are four in number, and said ribs on said sleeve are four in number so that relative rotation between said riser and said sleeve is one quarter turn.

* * * * *